United States Patent
Skjetne et al.

(10) Patent No.: US 9,238,585 B2
(45) Date of Patent: Jan. 19, 2016

(54) METHOD FOR TREATMENT OF WATER COMPRISING NON-POLAR COMPOUNDS

(75) Inventors: Tore Skjetne, Trondheim (NO); Roar Larsen, Ranheim (NO); Are Lund, Trondheim (NO)

(73) Assignee: SINVENT AS, Trondheim (NO)

(*) Notice: Subject to any disclaimer, the term of this patent is extended or adjusted under 35 U.S.C. 154(b) by 1015 days.

(21) Appl. No.: 12/667,501

(22) PCT Filed: Jul. 7, 2008

(86) PCT No.: PCT/NO2008/000260
§ 371 (c)(1),
(2), (4) Date: Sep. 22, 2010

(87) PCT Pub. No.: WO2009/008737
PCT Pub. Date: Jan. 15, 2009

(65) Prior Publication Data
US 2011/0000856 A1    Jan. 6, 2011

Related U.S. Application Data

(60) Provisional application No. 60/929,695, filed on Jul. 9, 2007.

(51) Int. Cl.
*B01D 21/00*    (2006.01)
*C02F 1/52*    (2006.01)
(Continued)

(52) U.S. Cl.
CPC ............ *C02F 1/22* (2013.01); *B01D 9/0013* (2013.01); *C02F 1/26* (2013.01); *C02F 1/001* (2013.01); *C02F 1/28* (2013.01); *C02F 1/40* (2013.01); *C02F 2101/32* (2013.01); *C02F 2103/10* (2013.01); *C02F 2103/365* (2013.01)

(58) Field of Classification Search
CPC .......... C02F 1/5236; C02F 1/52; C02F 1/025; B01D 17/047; B01D 37/025; C07C 9/00

USPC ............. 210/711, 712, 714, 708, 737, 194, 210/195.1, 175, 180, 181, 184, 201–203, 210/205, 206, 259, 340, 705, 713, 772, 210/774; 585/15; 63/533, 541
See application file for complete search history.

(56) References Cited

U.S. PATENT DOCUMENTS 3,119,771 A * 1/1964 Cottle ........................... 210/711
4,753,730 A * 6/1988 Maurer ......................... 210/483
(Continued)

FOREIGN PATENT DOCUMENTS

JP    61025682 A    2/1986
NO    321097 B1    3/2006
WO    WO 2005000746 A1 * 1/2005 ............... C02F 1/00

OTHER PUBLICATIONS

PCT/NO2008/000260 International Search Report, Oct. 2, 2008.
(Continued)

*Primary Examiner* — Nam Nguyen
*Assistant Examiner* — Clare Perrin
(74) *Attorney, Agent, or Firm* — Conley Rose, P.C.

(57) ABSTRACT

A process for removal of non-polar compounds from water, wherein the non-polar compounds exist in dissolved or dispersed form, wherein the water is led through a preparation tank wherein the temperature is adjusted and wherein possible solid particles are removed. The water is then led via pipe into a reactor tank and is mixed with a hydrate forming compound, wherein simultaneously hydrate seeds are added which have been recycled for continuous use in the process; whereby the drops or molecules of the non-polar compounds are attached or associated to hydrate particles being formed in the reactor tank. The hydrate particles are separated from the water and melted. The hydrate forming compound is recycled to the reactor tank and the non-polar compounds discharged. In addition, a device for use of the process as well as hydrates for removal of non-polar compounds in water.

9 Claims, 2 Drawing Sheets

(51) Int. Cl.
  C07C 9/00 (2006.01)
  C02F 1/22 (2006.01)
  B01D 9/00 (2006.01)
  C02F 1/26 (2006.01)
  *C02F 1/00* (2006.01)
  *B01D 37/00* (2006.01)
  *B03D 3/00* (2006.01)
  *B01D 21/01* (2006.01)
  *B01D 35/18* (2006.01)
  *C02F 1/40* (2006.01)
  *C02F 101/32* (2006.01)
  *C02F 103/10* (2006.01)
  *C02F 1/28* (2006.01)
  *C02F 103/36* (2006.01)

(56) References Cited

U.S. PATENT DOCUMENTS

2005/0082214 A1    4/2005   Max
2006/0273036 A1*   12/2006   Max et al. .................... 210/702
2007/0004945 A1*    1/2007   Phelps et al. ................... 585/15

OTHER PUBLICATIONS

Indian Office Action dated Feb. 17, 2015 for Indian Application No. 462/KOLNP/2010 (1 p.).

* cited by examiner

METHOD FOR TREATMENT OF WATER COMPRISING NON-POLAR COMPOUNDS

CROSS-REFERENCE TO RELATED APPLICATIONS

This application is a 35 U.S.C. §371 national stage application of PCT Application No. PCT/NO2008/000260, filed 7 Jul. 2008, and entitled Method for Treatment of Water Comprising Non-polar Compounds, which claims priority to U.S. Provisional Patent Application No. 60/929,695, filed 9 Jul. 2007, all of which are hereby incorporated herein by reference.

STATEMENT REGARDING FEDERALLY-SPONSORED RESEARCH OR DEVELOPMENT

Not applicable.

BACKGROUND

The present invention concerns a method for purification of water containing non-polar compounds, dispersed or dissolved in water.

In this invention, non-polar compounds means molecules with predominantly hydrophobic features so that their affinity to water is small, but they can be present in water even with a very low solubility or may have entered the water phase through a prior treatment which has brought them there either in molecular form or dispersed in one way or another or as droplets. Typical examples of such compounds are alkanes, wax, aromatics and larger hydrocarbons. It also comprises fatty acids, alcohols, amines and other organic molecules which are not very water soluble when the length of their hydrocarbon chain is long. Many of these molecules will not be tolerable in a natural environment; hence they should not be in an effluent flow. Many of them may have been added to the water in one process or another, and should preferably be collected and recycled to the process instead of being released into the nature. It is cost saving as well as environmentally friendly to reuse them.

As an oil field matures, the oil will have to be produced together with an increasing amount of water. This water will contain a certain amount of oil, chemicals and salts originating from the production process and the equilibrium condition present prior to start of the production.

The oil companies aim at achieving a maximum degree of recovery within the financial frames given by the investment costs (CAPEX), operational cost (OPEX), oil price and tax demands. At the same time, legislational restrictions to reduced discharge of oil and chemicals related to the activity gets stricter. Common for the different purification technologies used today are their removal of oil down to a certain level below the 30 ppm-requirement of OSPAR (abbreviation for Oslo-Paris, an EU consolidated protocol for oil and gas recovery in the north-east Atlantic Ocean). The discharge from the Norwegian shelf is below 20 ppm, and is moving towards 10 ppm. This is by the Norwegian government accepted as "zero-discharge", while awaiting the results of the ongoing reports from the oil companies to SFT, and in absence of better technology.

New requirements and stricter interpretation of the zero-discharge requirement are expected from 2008/2009. Current solutions are not approved for arctic waters. This implies a need for development of new and better technology in order to satisfy the legislational requirements and make the oil companies able to produce oil also in the future.

NO 321.097 describes equipment for treating water by drawing completely clean water from the contaminated raw-water. Hence the impurities remain in the mother liquor. This has been shown to be very efficient for salts and many different water soluble (hydrophilic) chemicals. Purification efficiencies better than 90% removal of impurities are achieved in one purification step, i.e. substantially better than 99% after two steps. A third purification step would be able to improve the result even further; however this will more rarely be necessary. The efficiency increases after each new purification step.

From tests so far, it is evident that the main source of impurities carried on with the purified water is impurities existing as dissolved in water which get deposited on the surface of the hydrate crystals. This problem may be reduced by making the crystals as spherical as possible and with a diameter as large as possible. The round shape is beneficial because the ratio of surface to volume is the most favorable, while the size is important because the forces restraining water between the crystal grains (the capillary forces) are lower with large spheres than with small.

It has been shown that the most non-polar, oily, hydrophobic compounds dispersed in the flow of water, will have larger affinity towards the surface of the hydrates than towards the mother liquor/the water they come from. When such compounds are present in the raw water, they will rather quickly be deposited on the surface of the hydrate particles rather than staying dissolved or dispersed in the water. In this case oil will follow with the hydrates and the method according to NO 321.097, the Ecowat-process, will not perform optimally.

In this case it could be more optimal to direct the process towards crystals with a larger specific surface. This may be controlled through pressure and temperature. When the temperature is reduced and/or the pressure increased, the crystals will turn into flatter structures which may have projecting arms (dendrites), and thereby get a substantially larger specific surface.

SUMMARY OF THE EMBODIMENTS OF THE INVENTION

A purpose of the present invention is to arrive at a process solving the problems of non-polar compounds dispersed or dissolved in water which shall be purified.

The embodiments of the present invention are thereby based on the utilization of hydrates for the withdrawal of non-polar compounds from water regardless of the form in which the non-polar compounds exist in the water. The surface of the hydrates is such that non-polar compounds will associate with the hydrate rather than exist in the surrounding water. This works for hydrates being formed and growing in the same water as the non-polar compounds are present in, as well as for hydrates which are pre-prepared and packed as a porous system through which the water flow may be led.

The embodiments of the invention provide a process for removal of non-polar compounds from water, wherein the non-polar compounds are present in dissolved or dispersed form, where the water is first led through a preparation tank (A, F) wherein the water temperature is adjusted to the requirements of stable hydrates and where possible solid particles are removed. Then the water is led by pipes (2, 13) into a reactor tank (B, G) and is mixed with a hydrate forming compound from pipe (6, 17), wherein simultaneously hydrate seeds are added from pipe (7, 23) recycled from pipe (3, 14) for continuous use in the process. The drops or molecules of the non-polar compounds get attached or associated to hydrate particles formed in the reactor tank (B, G), these hydrate particles are separated from the water and melted. The hydrate forming compound is recycled through pipe (6, 17) to the reactor tank (B, G) and the non-polar compounds discharged via pipe (8, 22).

The water is separated through a separation process which may be based on different methods such as centrifugation, sedimentation and/or filtration, wherein hydrate crystals with non-polar compounds no longer follow the flow of water. The hydrate crystals with the non-polar compounds are led in a separate flow or through a batch-wise process over to melting so that the non-polar compounds are separated from the original flow of water. After melting, the non-polar compounds together with smaller amounts of water may be sent back to their place of origin, to traditional separators which will be obvious in connection with oil production or sent through a new purification step based on the process described above so that further concentration of the non-polar compounds may take place.

Another aspect of the embodiments of the invention is a device for removal of non-polar compounds from water, wherein the non-polar compounds are present in dissolved or dispersed form, comprising a pipe (1, 12) through which the water is led into a preparation tank (A, F) wherein the temperature is adjusted and possible solid particles removed, a pipe (2, 13) leading to a reactor tank (B, G) wherein the drops or molecules of the non-polar compounds get attached or associated to formed hydrate particles, a pipe (3, 14) leading to an equipment for separation and melting, and a pipe (7, 23) being a recycle pipe for hydrate seeds and a pipe (6, 17) being a recycle pipe for hydrate forming compound to reactor tank (B, G).

DETAILED DESCRIPTION OF EMBODIMENTS OF THE INVENTION

Figure 1:
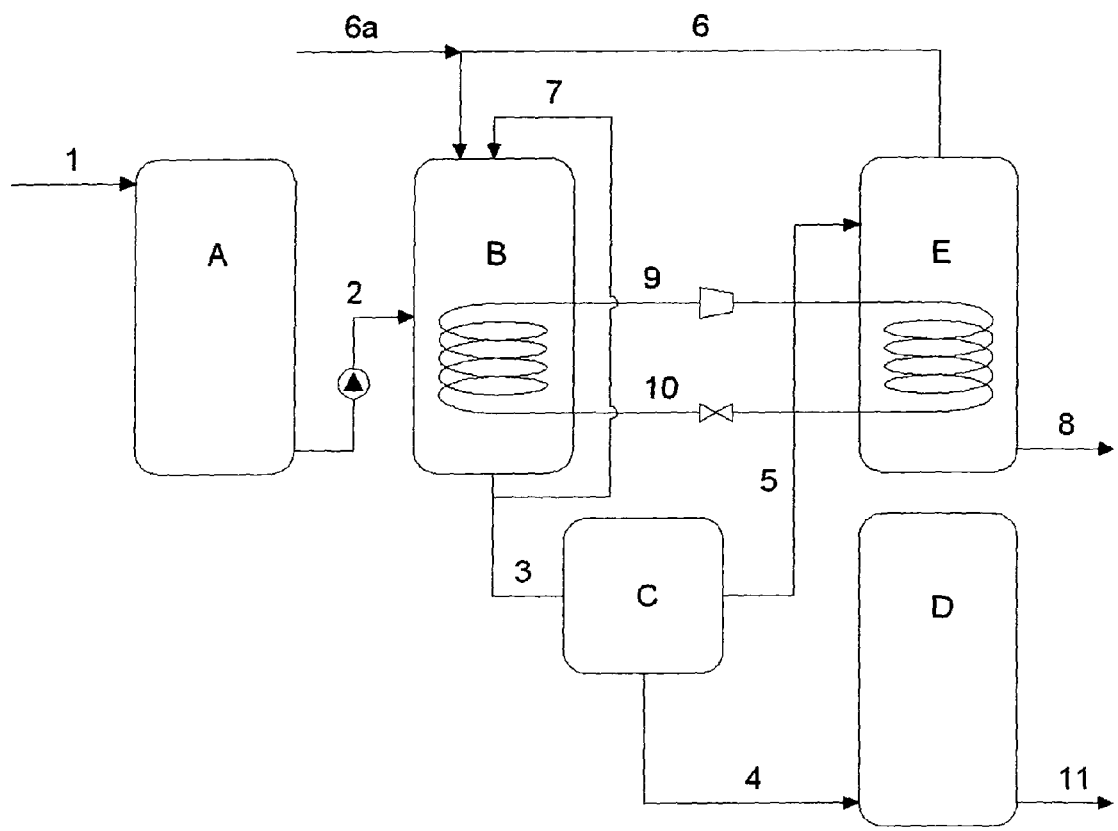
FIG. 1: Basic processing for treatment of water with non-polar compounds.

The following description is based on FIG. 1. Untreated, contaminated water enters the treatment process through inlet pipe 1 and passes through a preparation tank A wherein the temperature is adjusted so that the water is suitable for the hydrate requirements later in the process, and any solid particles are removed. The temperature in the water is adjusted to the function temperature of the process, while the energy produced or added is heat exchanged with other elements of the process for optimal utilization of energy. The water enters the reactor B via pipe 2.

The temperature and pressure inside the reactor tank B will be determined dependent of the hydrate forming compound used. A large number of possible hydrate forming compounds exists. These may, for example, be selected from $C_1$-$C_6$ hydrocarbons, $CO_2$, halogenated hydrocarbons, wherein halogen is selected from chlorine and fluorine, tetrahydrofuran, ethylene oxide, noble gases selected from helium, neon, argon, xenon, krypton, sulphur hexafluoride, dinitrogen oxide. Some compounds may be preferred because they form hydrates at low pressures and over a large temperature interval, while others may be preferred because they are more easily accessible. Examples of some compounds giving hydrates at low pressures are some chlorofluorocarbons (freons), $C_3$-$C_5$-alkanes such as propane and butane, and cycloalkanes such as cyclopentane. Some compounds which may have special availability are such as e.g. $CO_2$ and methane. Others may also be preferred, or excluded, either because of different environmental regulations or needs connected to the further utilizations of the water. Situations may for instance occur where propane would be the technically best choice, but $CO_2$ would be preferred by the consumers.

The hydrate forming compound enters the system by pipe 6a to the reactor B and is recycled via pipe 6 while hydrate seeds are added from pipe 7. From the reactor the flow of fluid enters pipe 3 to the separation element C where water free of non-polar compounds flows via pipe 4 to the product tank D. The product tank D is drained in relation with the specific needs where the process is utilized. Prior to draining it is often desirable to adjust the temperature of the effluent water so that the process does not cost more energy than necessary. In some instances further treatment in order to remove water soluble compounds according to NO 321.097, the Ecowat-process, will follow as additional processing after tank D.

The hydrate seeds from the reactor tank B may be separated from the flow in pipe 3 or from the separator C before being returned to the reactor tank B.

During the formation of hydrate crystals energy is liberated. To achieve a stable process, this energy is transported over to the melting process via a heat pump indicated by the pipes 9 and 10 where the figure shows a closed process with compressor, valve and heat exchange between reactor B and melting chamber E. The transport of energy may in some instances rather be solved through direct transmission between the two tanks B and E or other reasonable energy solutions.

Figure 2:
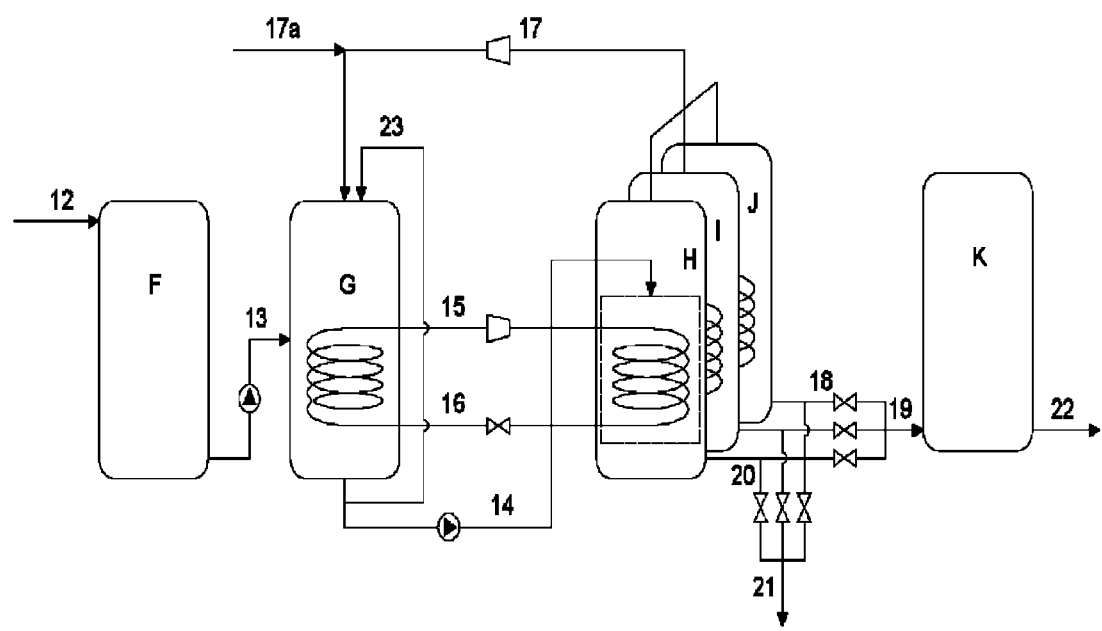
FIG. 2: Combined separation and melting through a continuous batch-wise processing.

From the separator C the hydrate crystals enter the melting chamber E through pipe 5. There are possibilities to combine separation and melting for example as shown in FIG. 2.

The melting process in tank E may occur by reduction of pressure and/or rising of the temperature compared to inside the reactor. The energy is added from the reactor tank B via the heat exchanger pipes 9 and 10. Then the hydrate forming compound is liberated from the crystals and this may be recycled through pipe 6 most often aided by a pump or compressor.

When the crystals dissociate, the non-polar molecules no longer have any surface to attach to, they are liberated into water from the hydrate crystals. As the concentration of non-polar compounds now is significantly higher than earlier, they may form droplets which more or less efficiently coalesce to larger drops and float up to the surface of the water as they normally have a density lower than water. The hydrate forming compound may in many occasions be an active part of this liberation as it contributes to buoyancy for droplets so that they in a larger extent and faster come to the surface and can be transported out of the chamber via pipe 8. In this connection it is beneficial that the hydrate forming compound is a gas since that would have a positive influence on the liberation of the non-polar phase through increased buoyancy.

| Hydrate forming compound | Pressure [bara] | Temp. [° C.] |
|---|---|---|
| $CO_2$ | 20-30 | 0-8 |
| Propane | 3-10 | 0-6 |
| Methane | 30-50 | −2-4 |
| Cyclopentane | 1-3 | 0-10 |

The table shows typical conditions in the reactor B. During melting, the pressure must be reduced or the temperature increased, either separately or simultaneously.

Water soluble compounds will be present in the product flow in pipe 11 out of tank D. This flow of water is in the end led further over into an Ecowat-process adapted to water soluble impurities (NO 321.097) for a continued purification if necessary.

If the raw water comes from other industry processes than oil production, the non-polar compounds may be processed as by-products or recycled in the production in the same way as may be done with water soluble compounds, when these have been concentrated through an adapted Ecowat-process (NO 321.097).

FIG. 2 shows another embodiment of the invention where separation and melting is built into the same unit. In the figure three parallel units H, I or J (there may be less than or more than three) are drafted. This unit is a container designed for the functional pressures and temperatures required by the process. Inside the unit is a large filter collecting hydrates from pipe 14 and discharging water free of non-polar compounds through pipe 19 into tank K. When the filter is suitably filled or exposed to water, the fluid flow is connected over to the next unit being in parallel, for example from H to I. The crystals with non-polar compounds of the unit H must now be discharged by rising the temperature in the filter. This is done by receiving energy from the reactor G through the heat pump circuit 15 and 16. The temperature in the filter rises and the hydrates melt. The hydrate forming compound enter the system via pipe 17a and is recycled via 17 back to the reactor G. Water and non-polar compounds are led out from the filter through pipe 20, while purified water is led out through 18.

The removal of non-polar compounds can also take place if no hydrates are present in the reactor, but only in the filter so that water is flowing through. In such a case, the filter must have been pre-filled with hydrates. Then the water, prior to flowing into the filter, must be saturated with hydrate forming compound so that the water cannot dissolve the crystals in the filter.

The pipes 14, 17, 19 and 21 are connected to valves controlling the flow to and from each of the filters in parallel so that the sequence filling, melting and discharging can be continuous and give a steady flow of water in and product water out of the plant. Transport of energy from reactor to melting is included as heat pump with the pipes 15 and 16. In this plant the flow of raw water enters in pipe 12 for pre-treatment in tank F and out of this in the same way as shown in FIG. 1. The post-treatment tank K in this case also has an important function as the energy into and out of the process may be conserved so that the process is as energy optimal as possible.

This implies that non-polar compounds may be removed from water in an efficient way if they are exposed for hydrates in the flow of water. The hydrates may exist in freely suspended form in the flow of water or stay more stationary in a filter or similar as shown in FIG. 2 where the water phase may be circulated through. When the non-polar compounds have attached to the hydrates, the hydrates are separated from the water phase. After isolation of the hydrates, they can be melted so that water and hydrate forming compound are separated from each other. The non-polar compounds may now be treated further after pipe 21 for further concentration or they may be treated in another way so that they become products rather than waste material. The simplest post-treatment relevant in relation to oil recovery, is sending this flow back to the separators as a regular production flow.

For example the invention is particularly useful for water formed during the production of oil. Through the production process some oil molecules or oil drops could be found in the aqueous phase even after many separator steps. There exist different methods for post-treatment of the water in order to avoid the oil being released with effluent water from the recovery. These may be extractions, flotations, coalescing techniques with subsequent flotation and other methods of treatment. The hydrate association is a new way of removing oil from water. The more traditional methods have problems with reducing the amount of residual oil lower than 5 mg/l water. In some cases values down towards 2 mg/l water may be achieved.

In experiments with the process according to this invention the water to be purified has had initial concentrations around the range in which other methods reach their limits. From there a purification efficiency exceeding 90% was observed so that the treated water contained less than 0.5 mg/l water. It is probable that this invention can get even more efficient through an industrialisation, so that very low residual amounts may be achieved after treatment. This would be very important for production of oil in particularly vulnerable environments such as arctic waters and spawning ground for large populations of fish. It will also be of major importance for the final production of many oil fields. Together with the last barrels of oil from a well, large amounts of water will be produced, and the requirements to a possible discharge of this water will be very strict.

One large benefit with the invention is that the process does not include any other use of chemicals. Thereby no new environmental issue arises, as a result of another being solved.

Besides the oil production the same factors will apply for refineries. There it will not have any influence if there is production of products from the bedrock or if biological oils are being treated. Effluent water from the process should anyhow be free of oil.

Likewise the present process may be used in connection with chemical process industry processing products where non-polar compounds may easily get into effluent water. The invention may then prevent these compounds from getting into the environment.

The invention claimed is:

1. A process for removal of non-polar compounds from water, wherein the non-polar compounds are present in dissolved or dispersed form, the process comprising:
   leading the water through a preparation tank wherein the temperature is adjusted and wherein solid particles are removed;
   leading the water via a first pipe into a reactor tank and mixing the water with a gas hydrate forming compound from a second pipe; adding gas hydrate seeds into the reactor tank from a third pipe which is recycled from a fourth pipe, which is an output pipe of the reactor tank;
   forming gas hydrate particles from the gas hydrate forming compound and a first portion of the water;
   attaching or associating the non-polar compounds to the gas hydrate particles;
   separating the gas hydrate particles and the non-polar compounds from a second portion of the water that did not form gas hydrate particles with the gas hydrate forming compound;
   melting the gas hydrate particles to liberate the gas hydrate forming compound from the non-polar compounds and the first portion of the water;
   recycling the gas hydrate forming compound through the second pipe into the reactor tank; and discharging the non-polar compounds and the first portion of the water.

2. The process according to claim 1, wherein melting the gas hydrate particles occurs in a melting chamber by transmission of heat via a closed heat exchanger system between the reactor tank and the melting chamber.

3. The process according to claim 1, wherein separating and melting the gas hydrate particles occurs in one or more parallel units comprising a filter, wherein filling, melting, and discharging of the gas hydrate particles may be performed continuously.

4. The process according to claim 1, wherein the gas hydrate forming compound is selected from the group comprising chlorofluorocarbons, carbon dioxide, and $C_1$-$C_5$-alkanes.

5. The process according to claim 1, wherein the gas hydrate forming compound is $CO_2$, and the temperature in the reactor tank is from 0 to 5° C.

6. The process according to any of the claims 1 to 5, wherein the gas hydrate particles have a larger specific surface than spherical particles.

7. The process according to claim 1 wherein the second portion of the water is water substantially free of non-polar compounds.

8. The process according to claim 5 wherein the pressure in the reactor tank is from 20 to 30 bar-absolute.

9. The process according to claim 1 wherein the gas hydrate particles have projecting arms.

\* \* \* \* \*